Patented Dec. 16, 1924.

1,519,708

UNITED STATES PATENT OFFICE.

JESSE TAPP AND WILLIAM EDWARD SHORT KNIGHT, OF DUNEDIN OTAGO, NEW ZEALAND.

MACHINERY-BELT FASTENER.

Application filed July 23, 1923. Serial No. 653,315.

*To all whom it may concern:*

Be it known that we, JESSE TAPP and WILLIAM EDWARD SHORT KNIGHT, both subjects of King George V of Great Britain, residing at 40 Dowling Street, Dunedin Otago, in the Dominion of New Zealand, have invented certain new and useful Improvements in Machinery-Belt Fasteners, of which the following is a specification.

This invention relates to belt clips made for the purpose of joining a belt to become endless, used commonly for driving shafting and for machinery.

The object of the invention is to provide a belt clip that has all the necessary grip required to maintain the degree of driving tightness, and at the same time to be readily adjustable and detachable.

Referring to the drawings accompanying the specification,

Figure 1:
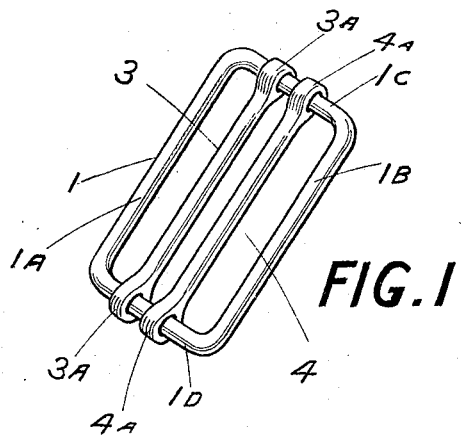
Figure 1 is a view illustrating the belt clip.
Figure 2:
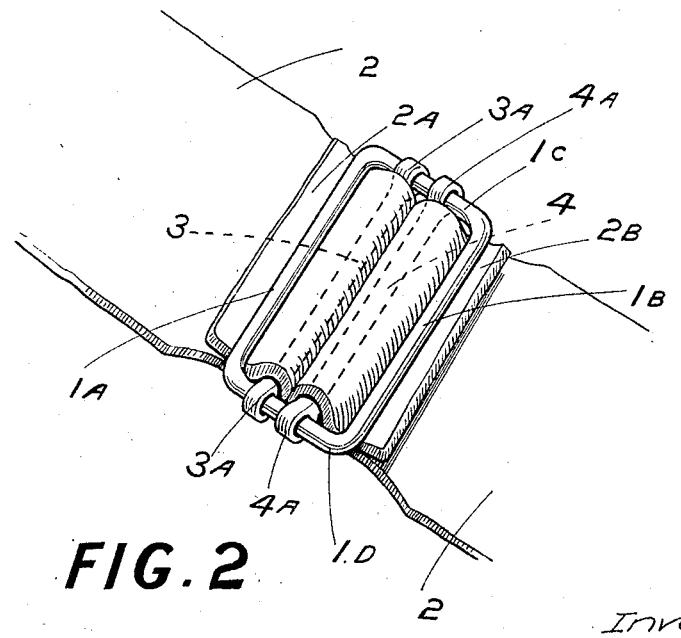
Figure 2 illustrates the clip applied to a belt.

There is metal frame 1, the width of which would be suitable for the width of belt 2, the ends $2^A$ and $2^B$ of which are coupled by the metal belt clip to form an endless belt for driving purposes; the dimensions of the belt clip vary accordingly as the width of the belt varies, as for example, the clip in use on a three inch belt, the inside measurement of the frame 1 would require to be not less than three inches, and just sufficiently more to allow the belt 2 to pass between the side members $1^A$ and $1^B$ of the frame 1, the said frame consisting of side members $1^A$ and $1^B$, and end members $1^C$ and $1^D$. There are two lateral bars 3 and 4, the ends $3^A$ and $4^A$ of the said bars being fashioned to engage the end members $1^C$ and $1^D$ and be slidable therein.

Its application to a belt is simple, inasmuch as the ends $2^A$ and $2^B$ are inserted up through the metal frame 1 between the lateral bars 3 and 4 from one side of the frame, then over the said lateral bars 3 and 4 returning through the frame from its other side, reposing under the sides $1^A$ and $1^B$, the belt becoming thereby fastened and made endless. When strain is upon the belt, the lateral bars slide along the ends $1^C$ and $1^D$ of the frame 1 to force engagement of the belt 2, with the side members $1^A$ and $1^B$; it is obvious the greater the strain the tighter the grip.

What we claim as new and desire to secure by Letters Patent is:—

1. A belt fastener, comprising a rectangular frame positioned in a single plane, and two members each slidably connected to two sides of the frame, parallel to the two other sides of the frame, and positioned in the plane of the frame.

2. A fastener according to claim 1, said frame being integral and continuous, said members each having an eyelet in each end slidably connecting it to the frame and being integral and continuous.

In testimony whereof we affix our signatures.

JESSE TAPP.
WILLIAM EDWARD SHORT KNIGHT.

Witnesses:
JAMES THOMPSON,
AGNES WILSON.